Reissued Apr. 1, 1947

Re. 22,860

UNITED STATES PATENT OFFICE 22,860

LIQUID WAX POLISH

John M. Olson, St. Paul, Minn., assignor to Minnesota Mining & Manufacturing Company, St. Paul, Minn., a corporation of Delaware No Drawing. Original No. 2,331,925, dated October 19, 1943, Serial No. 250,544, January 12, 1939. Application for reissue March 7, 1944, Serial No. 525,478

6 Claims. (Cl. 106—4)

This invention relates to improvements in wax emulsions or polishes, for example of the type which may be employed in surfacing floors, linoleums, etc. More particularly the present invention relates to wax polishes of a type which is clear and which may be applied to surfaces to provide a protective and/or waterproof coating therefor.

In the production of wax emulsions or polishes, it is common to employ an emulsifying agent. Soaps, such as the sodium or potassium salts of fatty acids, have commonly been used as emulsifying agents. Polishes embodying such emulsifying agents possess the disadvantage that, when such polishes are applied to a surface to be protected, they are not waterproof. That is, the soaps remain in the final dried film or coating of the wax and, when any water is dropped or applied to the polished surface, the soaps again are put into solution in the water and serve to dissolve or emulsify the wax and thus destroy it as a protective coating.

To obviate the above mentioned disadvantage incurred by the use of such emulsifying agents as the sodium and potassium soaps of fatty acids, the use of ammonium compounds or of similar substances have been suggested as emulsifying or dispersing agents for wax, such materials having the advantage that the ammonia, or equivalent nitrogenous basic material, will evaporate upon application to a desired surface of a polish embodying the same, thus leaving the film or coating of wax polish free of the ammonia or the like and thus also free of the soap capable of serving as an emulsifying agent for the wax. However, wax polishes employing such an emulsifying agent as last mentioned have had a number of defects and thus have only been moderately successful. For example, some of such polishes, when applied as a protective film or coating to a surface, while the wax would not dissolve in water and be completely removed, as would films or coatings from polishes having sodium or potassium soaps as emulsifying agents, nevertheless they would become clouded or spotted by water and some of them were also removed to substantial extent by water. Another disadvantage or defect in wax polishes of the type last mentioned is that the polishes were of a cloudy or milky appearance as they occurred in the container and likewise gave a cloudy film when applied to a surface to be protected thereby. Since one of the major functions of wax polish is for purposes of beautification, as well as to protect surfaces, the disadvantages of a cloudy, milky wax polish will be readily apparent.

It is an object of the present invention to provide an emulsion or wax polish which is clear and will form a clear and relatively transparent film or coating. A further object is to provide a polish which, when applied as a surfacing or coating and allowed to dry, will be waterproof. Another object is to provide a wax film or coating which will not be spotted by drops of water. A still further object is to provide a wax film which is free or substantially free of the material which, when the wax was in liquid form prior to application, served as a dispersing agent for the wax in the aqueous vehicle. A still further object is to produce a wax of the self-polishing or no-rubbing type. Another object of this invention is to provide an improved wax polish which forms a film hard enough so that it will remain relatively free of scuff marks and yet is sufficiently flexible so that it may be bent, for example, in angles as great as 180° without cracking. These and other objects and advantages will become apparent from this application taken as a whole.

To illustrate the invention and a preferred method of making the same, illustrative ingredients, and portions thereof, as well as a suitable method for compounding the same will be given. The wax polish may contain the following ingredients:

Carnauba wax,
Fatty acid, e. g. oleic acid
Rosin
Ammonium hydroxide
Water
Casein The above ingredients may be compounded in the following manner and in the proportions stated:

| | Parts |
|---|---|
| Wax | 1 |
| Fatty acid | .25 |
| Rosin | .25 |
| Ammonium hydroxide | .27 |
| Water | 1.94 |

may be mixed together and heated to a temperature of about 195° F. for approximately one-half hour, or until the reaction is completed, as will be obvious to one skilled in this art. When the reaction is complete and a smooth, uniform composition is formed, it may then be diluted with about 6.5 parts of hot water and cooled to approximately 175° F. Then a casein solution may be added. The casein solution may comprise .1 part casein, .45 part water and a slight amount of ammonium hydroxide or equivalent, for example 0.01 part of ammonium hydroxide. This casein solution may be prepared by mixing and heating the ingredients to a temperature of approximately 150° F. The resulting casein solution may be added to the mixture of wax, fatty acid, etc., above mentioned, and the whole batch stirred to form a uniform, smooth mixture or emulsion. The polish or emulsion is then ready to be put into containers for shipment or marketing; that is, it is ready to be used as a no-rubbing polish for floors, linoleums, etc., and will provide a clear, i. e. non-cloudy, coating or film which is water proof. Such polish gives a pronounced Tyndall effect, which demonstrates that the wax is of very small particle size.

In order to still more specifically identify particular ingredients which have been used with a high degree of success in making polishes or wax emulsions as herein described, the wax employed may be a No. 3 carnauba wax, the fatty acid employed may be oleic acid, the rosin employed may be a water white wood rosin having relatively low melting point characteristics and the ammonium hydroxide specified may be a commercial ammonium hydroxide containing 28% ammonia. If a more dilute solution of ammonia is employed, then it would be employed in increasing amounts to provide an equivalent amount of the reactive ammonium radical.

By way of amplification of the compounding procedure hereinabove described, in preparing a wax polishing composition with a volatile, water-soluble saponifying or emulsifying reactant as herein illustrated, e. g. ammonia, ammonium compounds or ammonia derivatives, at temperatures at which the volatile agent would normally vaporize, such composition may be prepared by introducing such agent to the initial mixing of the unmelted portion of the composition prior to its heating, or the volatile reactants may be added after melting of the solid constituents. Some water, in addition to that in which the ammonia or equivalent is (or may be) dissolved, may be added during the reaction and dispersion or preliminary thereto. Further dilution of the wax dispersion may be had by further additions of water in order to arrive at a dispersion or polish having a solids content of the order of 10 or 15 per cent, a polish having a solids content of about 13.5 per cent having proved satisfactory and advantageous. While the ingredients may advantageously be compounded in the manner hereinabove illustrated, such compounding, if desired, may be carried out by mixing the wax, broken up in small pieces, together with fatty acid and rosin. A portion of the water and some of the volatile alkaline reactant may or may not be added at this time. The mixture of wax, rosin and fatty acid may be heated, while stirring or agitating the same, in a vessel (which may be open, if desired) to a temperature between 190° and 250° F. for a time of the order of one-half hour or until the solids are thoroughly melted or intermixed to form a uniform mixture. During this heating operation, all of the volatile reactant material and portions of water may be added (unless all the reactant material was initially added), preferably gradually, while the heating and stirring is continued until a colloidal suspension which approaches a true solution is formed, whereupon the composition may be diluted with boiling water and then cooled to about 175° F., for example. The solution or mixture of casein or equivalent, preheated to a temperature of about 150° F., may then be mixed into the composition. Such temperatures are maintained and stirring or agitation is continued until the composition is smooth and uniform; then it is cooled and stored in containers ready for use. Where necessary, due to impurities in ingredients or otherwise, the liquid wax composition may be strained or filtered prior to putting the same into containers.

Where temperatures in excess of the vaporization point of the ammonia or equivalent alkaline material are employed in reacting the same with fatty acid and/or rosin acid, the alkaline material will normally be employed in quantities substantially in excess of the molecular proportion required to react with the fatty acid and the rosin acid. The excess amounts of ammonia or the like (where a substantial excess is used) is believed, probably due to effervescence during reaction with the organic acids present, to play a significant part in the refinement of the particle size of the wax and in improving the lustre of the final dried wax film, though it will be understood that this is presented by way of theory only and not as a statement of presently known fact.

While my emulsion or polish has been illustrated by very specific proportions, it will be understood that I am neither limited as to these specific proportions nor to the exact compounds above illustrated. However, in respect to proportions, those of the above specific example are based on a fairly pure fatty acid. Where a fatty acid or lower acid number is employed, a proportionately higher amount of fatty acid should be used for comparable results. This is particularly true in the case of linseed fatty acids, for example, if such materials are employed. For example, in place of the particular wax mentioned, other carnauba waxes and/or candelilla wax, gama wax, suitable esters of acids such as cerotinic acid and/or numerous resin waxes may be employed in place of or in addition to the carnauba wax above specified.

In place of oleic acid, various other fatty acids may be employed. The fatty acid plays an important part in the clearness or transparency, gloss and brilliance of the final dried film or wax coating and accordingly must be one which will dry properly and otherwise will perform in a manner comparable to oleic acid. Other suitable acids include stearic acid, wool oil fatty acid and the like. That is, by indifferently selecting a fatty acid of widely different character than oleic acid, the character and/or quality of the final wax polish might be hindered and/or its clarity detracted from despite the action of rosin or rosin derivatives in promoting clarity.

In place of the rosin mentioned, other equivalent resins may be employed, other suitable resins being evident from the description hereinafter given, although rosin is a preferred material for a number of reasons including its advantageous effects (e. g. improving luster and/or waterproofness of final dried film or coating) and its commercial availability.

In place of ammonium hydroxide, other equivalent alkaline or basic materials, especially those composed of vaporizable ingredients and water may be employed, examples being the substituted ammonium compounds such as various monosubstituted or higher substituted amines, including, for example, mono-, di-, and tri-methylamine and the like. The alkaline material is one which will react with the saponifiable or equivalent materials at a high temperature, at which the dispersion of wax will be formed, and, if desired, at a temperature beyond the vaporization point of the alkali to secure a very small particle size of the dispersed wax particles, which is believed to be an important factor in the production of a clear wax polish which will remain uniform over substantial periods of storage.

The function which the casein serves is believed to be mainly that of a crawl-inhibiting agent. Other materials will also serve this function, one example being shellac, for example where the composition will be used under such circumstances or has its components, and proportions thereof, controlled so as to obviate difficulties of premature solidifying or jelling. Other examples include various proteins or the like.

A crawl-inhibiting material, in the nature of a surface tension reducer, which may also increase the lustre of the dried wax film, may be added to the liquid wax composition for controlling and maintaining its uniform spreading with respect to the surface to which it is to be applied, as linoleums, floors, varnished surfaces, and the like, without clouding the liquid composition or its film, while aiding in its waterproofness when in dried form. Such a material may or may not affect the viscosity of the liquid which incidentally, but necessarily, may aid in obviating poor covering characteristics of the wax polish, i. e. may aid in preventing crawling. These materials I have found to include, for example, basic amines such as tetrahydro-p-oxazine, diethyl ether of diethylene glycol, mixtures of tetrahydro-p-oxazine and diethyl ether of diethylene glycol, casein, mixtures of tetrahydro-p-oxazine and casein, or diethyl ether of diethylene glycol and casein, or other mixtures involving the same. In some cases as where mixtures of casein and tetrahydro-p-oxazine are used, the resulting film may have some tendency toward softness which may be overcome by the addition of a hardening agent, such, for example, as manila gum, fossil resin or various copal gums or other materials which will aid in producing a harder wax, which may be added in the form of a solution (or suspension) to the liquid wax composition. Ammonium hydroxide, for example, may be used to dissolve the gum and approximately 10 per cent by weight of a 20 per cent solution may be added to the liquid wax formula. Where the wax composition is to be spread immediately or soon after its formation, I may use a refined and bleached wax-free shellac, preferably freshly prepared.

Supplemental to what I have said above as to contemplated variations from the specific illustration hereinabove given, compositions comprehended by this invention include substantial variations. For example, the wax content may be increased by a third or more or reduced to two-thirds or less of the amount illustrated, depending upon the wax content desired in the polish. However care must be taken to maintain the fatty acid and rosin, or their equivalent, in such proportion to the wax as to attain the desired dispersion of the latter and also clarity of the emulsion or polish. While various proportions of fatty acid other than that illustrated above may be used, large excesses over that illustrated should be avoided in the interest of good ageing qualities and continued clarity of the wax polish. Further, careful control of the proportion of casein or equivalent crawl-inhibiting agent (or surface tension controller) is normally made in accordance with the amount of emulsifying agent employed, an increase in the amount of emulsifying agent usually requiring slightly more and a decrease requiring slightly less crawl-inhibiting agent. However, where casein is used as a crawl-inhibitor, it is usually employed in a proportion not less than about 0.75 of 1 per cent of the total weight of the aqueous emulsion or polish. The water content of the polish can, of course, be varied depending upon the solids content desired and the particular use to which the polish is to be put, as well as its method of application.

Without intending in any way to limit the present invention by theories as to chemical or other functions of any of the ingredients, but only in an endeavor to facilitate a clearer understanding of the invention as a whole, the following theories are presented:

In the finished polish, as it occurs in the container prior to application as a protective or beautifying coating for a surface, the wax is dispersed in the water or aqueous vehicle. One function of the fatty acid, rosin acid and ammonium hydroxide is to provide an ammonium salt of these organic acids which will aid in keeping the small wax particles in suspension or emulsion. The ammonium hydroxide would react with oleic acid, for example, to form ammonium oleate. It would also react with the abietic acid, or equivalent acid in the rosin, to form ammonium abietate or ammonium rosinate. However, in addition to providing abietic acid, the rosin evidently has some other advantageous effects on the wax and, in the final liquid wax polish, rosin will occur in the dispersed wax particles and/or contiguous thereto.

The water of course serves as a vehicle for the components of the polish which form the protective surface coating for linoleums, floors, etc.

By making a wax having ingredients herein illustrated, which may for example be compounded according to the method above described, a clear, non-cloudy liquid wax polish is formed which may be applied to form a protective and beautifying surface coat on floors, varnished surfaces, or the like. After application in the form of a coating or film, ammonia or the equivalent will evaporate, and of course the water will also evaporate, and there will be left a film or coating of a dense lustrous wax. The lustre of the wax, in the absence of rubbing or polishing, is undoubtedly due in part to the small particle size attained by producing a polish as hereinabove described, but the lustre is also contributed to by other factors, for example by virtue of the use of rosin or the equivalent.

By employing the ingredients illustrated above, or their equivalents, and by following a method of compounding of the type above described, the wax is dispersed in extremely small particle size, the wax particles largely having a diameter or particle size of less than 0.1 micron and, for example, of the order of .01 micron or less.

The importance of a wax which is clear in the container and will not jell or solidify upon storage or standing and one which will form a clear film after application, and which will also provide a highly lustrous surfacing, without requiring any rubbing in addition to being waterproof and free of the tendency to become spotted or clouded when water comes in contact with it, will be evident without detailed discussion.

While the present invention has hereinabove been described and illustrated in various particulars, it will be understood that I comprehend all embodiments within the scope of the appended claims.

What I claim is:

1. A clear, non-cloudy, non-milky aqueous liquid wax polish having a solids content of 10 to 15%, said polish comprising wax which is predominantly of a particle size less than 0.1 micron dispersed in an aqueous vehicle, said wax polish being a dispersion of the oil-in-water type consisting substantially of water plus the following ingredients in proportionate parts by weight of the following order:

| | Parts |
|---|---|
| Wax | 1.00 |
| Higher fatty acid | .25 |
| Rosin | .25 |
| Ammonium hydroxide | .27 |
| Casein | .088–.1 |

said polish upon application to a wood floor providing a non-creeping, non-crawling coating which hardens upon the evaporation of water and ammonia to form a clear transparent protective dried film which is substantially free of water-soluble ingredients and is substantially free of spotting by water.

2. The process of making a liquid wax polish comprising mixing carnauba wax, a higher fatty acid and rosin, agitating and heating said mixture to a temperature of the order of 200° F. for approximately a half hour to melt and blend the ingredients together, suddenly adding to the hot mixture a quantity of aqueous ammonium hydroxide, said quantity being in excess of the molecular proportion required to react with the said fatty acid and rosin, continuing to heat said mixture to form a colloidal solution in which ammonium soap is present, diluting the mixture with hot water after such colloidal solution has been reached, cooling said mixture to approximately 175° F., adding a casein solution, said solution being at approximately 150° F. and applying continued heat and agitation until the composition is smooth, whereby a clear non-milky liquid wax polish of the oil-in-water type is formed in which the wax content is of a particle size of less than 0.1 micron and which upon application to a surface dries to form a hard yet flexible clear film which will not re-emulsify in water, said film having a natural luster and being substantially completely free of any water-soluble constituent.

3. The wax polish composition substantially as defined in claim 1 further characterized in that it contains manila gum.

4. A stable aqueous liquid wax polish having a solids content of 10 to 15%, said polish comprising wax which is predominantly of a particle size less than 0.1 micron dispersed in an aqueous vehicle, said wax polish being a dispersion of the oil-in-water type consisting substantially of water plus the following ingredients: wax, higher fatty acid, rosin, ammonium hydroxide and casein, said wax being present in highest proportion by weight of any of the named solids ingredients and casein being present in least proportion, said higher fatty acid and said rosin being present in intermediate proportions generally similar to each other, the said polish upon application to a wood floor providing a non-creeping, non-crawling coating which hardens upon the evaporation of water and ammonia to form a clear transparent lustrous protective dried film which is substantially free of water-soluble ingredients and is substantially free of spotting by water.

5. A stable aqueous liquid wax polish having a solids content of 10 to 15%, said polish comprising wax which is predominantly of a particle size less than 0.1 micron dispersed in an aqueous vehicle, said wax polish being a dispersion of the oil-in-water type consisting substantially of water plus the following ingredients: wax, a higher fatty acid, a resin compatible with said wax, a volatile alkaline compound of nitrogen and a hydrophilic organic colloid, said wax being present in greater proportion by weight than any of the other named solids ingredients and said hydrophilic organic colloid being present in lowest proportion of any thereof, said polish upon application to a wood floor providing a non-creeping, non-crawling coating which hardens upon the evaporation of the volatile constituents to form a clear transparent lustrous protective dried film which is substantially free of water-soluble ingredients and is substantially free of spotting by water.

6. A stable aqueous liquid wax polish having a solids content of 10 to 15%, said polish comprising wax which is predominantly of a particle size less than 0.1 micron dispersed in an aqueous vehicle, said wax polish being a dispersion of the oil-in-water type comprising water plus the following ingredients to the exclusion of any non-volatile alakli: wax, a higher fatty acid, a resin comprising an abietate and a volatile alkaline compound, said wax being present in proportion by weight in excess of each of said fatty acid and said resin, said polish upon application to a wood floor providing a substantially non-crawling coating which hardens upon the evaporation of the volatile constituents to form a clear transparent lustrous protective dried film which is substantially free of water-soluble ingredients and is substantially free of spotting by water.

JOHN M. OLSON.

REFERENCES CITED

The following references are of record in the file of this patent:

UNITED STATES PATENTS

| Number | Name | Date |
|---|---|---|
| 2,048,303 | Swartz | July 21, 1936 |
| 2,071,027 | Dacus | Feb. 18, 1937 |
| 2,177,240 | Brumbaugh | Oct. 24, 1939 |

FOREIGN PATENTS

| Number | Country | Date |
|---|---|---|
| 262,371 | British | Dec. 6, 1926 |

OTHER REFERENCES

Industrial and Engineering Chemistry, August, 1935, page 870.